United States Patent [19]

Neal et al.

[11] 3,858,320

[45] Jan. 7, 1975

[54] UNIVERSAL CULINARY TOOL WITH PROTECTIVE SCREEN SHIELD

[76] Inventors: James Neal, 1212 W. 19th Pl., Gary, Ind. 46407; Elbert Duvall, 639 Allen St., Gary, Ind. 46401

[22] Filed: Apr. 19, 1974

[21] Appl. No.: 462,428

[52] U.S. Cl............................ 30/323, 30/326, 2/17, 294/131
[51] Int. Cl. ............................................ A47j 43/28
[58] Field of Search ............ 30/286, 323, 326, 327, 30/295; 2/17; 294/59, 131

[56] References Cited
UNITED STATES PATENTS

| | | | |
|---|---|---|---|
| 689,778 | 12/1901 | Barnard | 294/131 |
| 830,016 | 9/1906 | Sims | 294/131 |
| 1,501,020 | 7/1924 | Small | 30/295 X |
| 2,436,507 | 2/1948 | Ellwood | 2/17 |

*Primary Examiner*—Al Lawrence Smith
*Assistant Examiner*—J. C. Peters

[57] ABSTRACT

A universal culinary tool including a protective screen shield and adapted to be applied to kitchen type utensils, such as forks, spoons, and the like in a manner to protect the hand of the individual which is grasping the tool in a manner to protect the hand and the individual against injury from grease splatter, heat of the cooking fire, and the like during the individual's use of the utensil in stirring or manipulating food in the cooking process. The tool is comprised of a handle adapted to receive the shaft of the utensil therein in a removable manner therefrom, with the shield adapted to be fit about the shaft and slidable to any selected position thereon and to be pivotable relative thereto and to completely surrounding the shaft and project outwardly therefrom.

3 Claims, 6 Drawing Figures

Patented Jan. 7, 1975
3,858,320
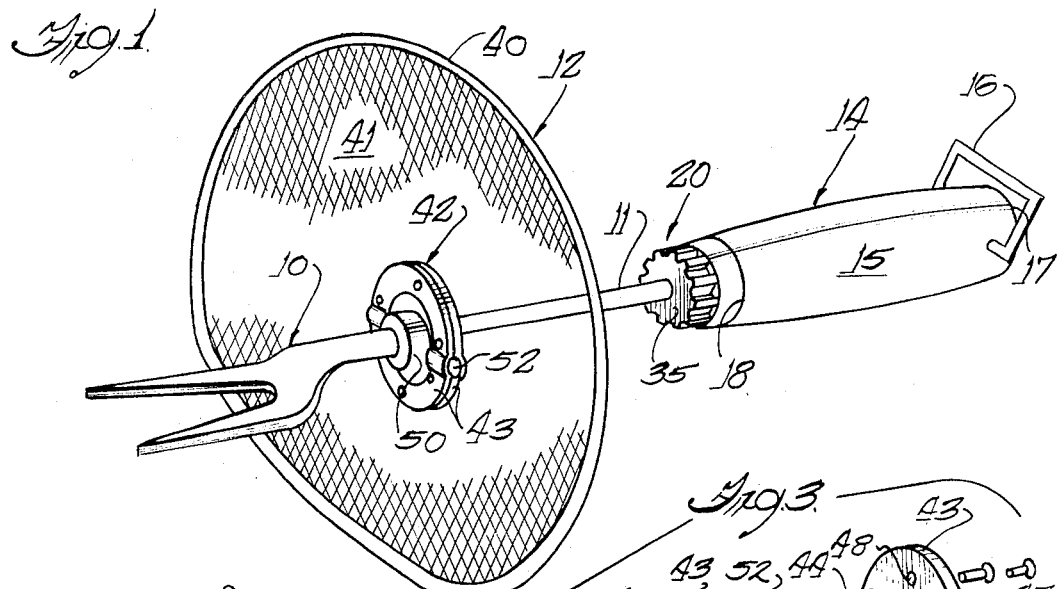
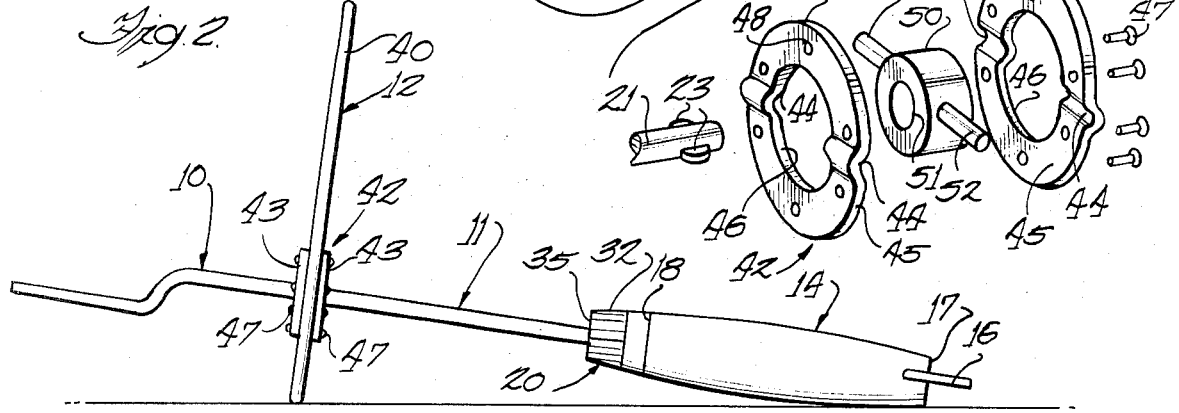
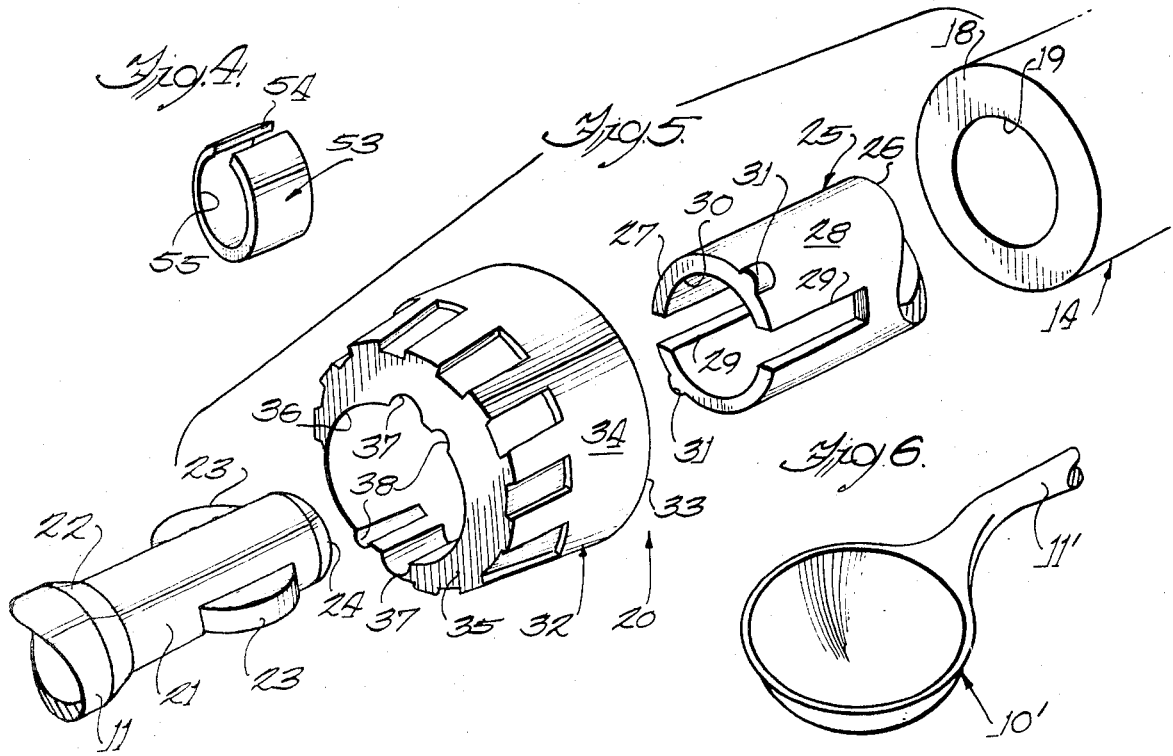

UNIVERSAL CULINARY TOOL WITH PROTECTIVE SCREEN SHIELD

BACKGROUND OF THE INVENTION

1. Field of the Invention

This invention relates generally to cooking implements and more particularly to a novel universal culinary tool with a protective screen shield adapted to be applied to kitchen utensils in a manner to provide a firm hand grip for the individual while simultaneously providing a protective shield to protect both the individual's hand and the individual from grease splatter, heat, and the like during the stirring of manipulating of foods during cooking.

2. Description of the Prior Art

As is well known in the use of cooking implements during the cooking process, such as forks, spoons, and the like, that the individual's hand grasping the utensil is exposed to grease splatter and heat from the product being manipulated in cooking as well as from the fire such that it is not unusual for the individual's hand to be burned or otherwise injured during the stirring or manipulating of foods during cooking. Further, it is not unusual for grease splatter to strike other parts of the individual's body, such as the face or arm or the like, thus often burning or otherwise injuring such body parts.

In view of this hazard during cooking, especially from the splattering of hot grease, prior art items have been developed for protecting the individual such as a screen which is intended to be placed over the pan or pot in which the food is cooking to provide a cover therefor and to prevent the grease from splattering out of the same, but while such cover may protect the surrounding areas it does not protect the individual from grease splatter during those times when it is necessary to manipulate the food products in the pan with it being required that the cover be removed to expose the pan and also expose the individual to the splattering grease.

Further items have been developed in the prior art to provide a shield for the hand of the individual, such normally taking the form of a restrictive conically shaped hand shield which is affixed to the handle of the implement with the individual's hand grasping the handle disposed inwardly of the cone to manipulate the implement, but while such may protect the individual's hand it does not provide any protection for the remainder of the individual's body from splattering grease which will normally bypass the shield to strike the individual's arm or face causing burns or other injuries thereto. A hand guard of this type is as disclosed in Sims U.S. Pat. No. 830,016.

SUMMARY OF THE INVENTION

The present invention recognizes the need for a device to protect both the hand and other body parts of an individual from the hazards of hot splattering grease during manipulation of food products in the cooking thereof, and provides a novel solution thereto in the form of a screen shield adapted to be mounted about the shaft portion of the utensil and which projects generally radially outwardly therefrom and which thus protects both the individual's hand behind the shield as well as other parts of the individual's body, the shield being pivotable relative to the shaft for the most preferred positioning thereof depending upon the use of the utensil, and with there further being provided a novel handle wherein the utensils are interchangeably inserted and with the handle providing a comfortable grasping portion adapted to be firmly gripped in an individual's hand for manipulation of the utensil.

Among the features and advantages of the present invention is the provision of a universal culinary tool with a protective screen shield which is relatively simple in its construction and which therefore may be readily manufactured at a relatively low cost and by simple manufacturing methods; one which is possessed of few parts and which therefore is unlikely to get out of order; one which provides for rapid interchangeability of implements and utensils, such as forks, spoons, and the like; one which is rugged and durable and which therefore may be guaranteed by the manufacturer to withstand many years of intended usage; one which is easy to use and reliable and efficient in operation; one which can be retailed at a sufficiently low price to encourage its widespread use; one which is aesthetically pleasing and refined in appearance; and one which is otherwise well adapted to perform the services required of it.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the tool and shield of the present invention illustrated as having a fork affixed thereto;

FIG. 2 is a side elevational view of the device of FIG. 1;

FIG. 3 is an exploded perspective view of the swivel connection and mounting device for securing the shield to the shaft of the utensil;

FIG. 4 is a perspective view of the elongated C-shaped spring used in the shield mounting device;

FIG. 5 is an exploded fragmentary perspective view of the front end portion of the handle showing the lock nut mechanism for securing the utensil to the handle; and FIG. 6 is a fragmentary perspective view of a typical utensil which may be used interchangably with the fork as illustrated in the previous drawings.

DESCRIPTION OF THE PREFERRED EMBODIMENT

Referring now to the drawings in detail there is illustrated a preferred form of a universal culinary tool with a protective screen shield which is shown for purposes of illustration as affixed to a fork type utensil 10 having a shaft 11, the tool comprised generally of two component parts, namely the screen shield 12 and the handle 14. It is to be understood that while the shield 12 and handle 14 are shown as being used with a fork utensil 10, that the same are adapted to be used interchangably on other kitchen utensils, such as spoons, knives, ladles, and the like, a typical interchangable utensil being illustrated in FIG. 6 in the form of a spoon 10' having a shaft 11'.

Referring first to the handle 14 it is seen that the same is comprised of a body portion 15 of a generally elongated cylindrical configuration which is provided with swivel loop 16 at the back end 17 thereof for use for storage purposes, and which is provided adjacent its front end 18 with an axially extending elongated cylindrical recess 19 which receives thereon a locking nut mechanism 20 operable in a manner to detachably attach utensil shaft 11 thereto.

Referring now to FIG. 5, it is seen that the end of the utensil shaft 11 adapted to be attached to locking mechanism 20 is provided with a reduced diameter shaft terminal end portion 21 which is of a cylindrical configuration and which defines with shaft 11 a tapered annular shoulder 22. Provided on the side walls of shaft end portion 21 at diametrically opposed locations thereon are a pair of axially extending radially projecting locking ears 23 each of an arcuate configuration and each spaced slightly inwardly from the terminal end 24 of the shaft, it being noted that the diameter measured between the outermost projecting surfaces of the locking ears is substantially the same as the main portion of the shaft 11. An elongated hollow open ended cylindrical shaped shaft supporting collar member 25 is provided having a back end 26 and a front end 27 with cylindrical side walls 28, the back end 26 being axially inserted into handle recess 19 and permanently affixed thereto with the front end portion projecting outwardly of the front end of the handle and with the front end provided with a pair of diametrically opposed axially extending slots 29 opening out of the front end 27 with the slots being identical in size and configuration and with each slot adapted to slidingly receive therein an associated locking ear 23 of the shaft 11. The interior diameter of the bore 30 of the shaft support collar member 25 is slightly greater than the diameter of the reduced shaft portion 21 to permit the same to be axially inserted thereinto with the locking ears 23 received in slots 29. Circumferally spaced from the slots 29 and disposed contiguous to front end 27 are a pair of diametrically opposed axially extending cam members 31 each of which projects radially outwardly from the side walls 28 and with each having an arcuate cross-section to provide cam type outer wedging surfaces thereon.

A hollow open ended twist locking nut 32 is provided having a back edge 33 which is contiguous to cylindrical side wall surfaces 34 which project away from the back edge to terminate adjacent a front end 35 which is provided with reduced diameter opening 36 therein which extends thereinto and which is of a diameter approximately equal to the exterior diameter of support collar 25 at the front 37 thereof. Disposed inwardly of recess 36 and projecting axially therealong are a first pair of diametrically opposed slots 37 each having an arcuate cross-section with each of the slots being larger than the size and configuration of the cams 31 on support collar 25. Spaced a short distance circumferally from each of the slots 37 are a second pair of diametrically opposed slots 38 each extending axially into the bore 36 and with each having an arcuate cross-section of a lesser diameter and configuration that the cams 31.

In operation, the locking nut 32 is concentrically disposed about the shaft collar 25 with back edge 33 in abutting relationship with handle front edge 18 and with the locking nut being rotatable concentrically about the support collar between a position engaging either slots 37 or 38 with the cams 39. When a utensil, such as fork 10, is to be inserted into the handle then lock nut 32 is placed with slots 37 disposed in engagement with cams 32 after which shaft reduced diameter end 21 is axially inserted through bore 36 and into support collar bore with locking ears 23 being engaged into slots 29. The locking nut 32 is then gripped in the individual's hand twisted to rotate the same relative to the support collar in a manner to move cams 31 out of slots 37 and into smaller slots 38, these smaller slots causing an inward deflection of the end portions of the front end of the support collar in a direction toward each other thus squeezingly compressing the locking ears 23 by slots 29 which are reduced in width by such inward movement, this removably retaining the shaft of the utensil to the handle until an individual wishes to remove the same which is accomplished by reversing the above procedure as to against twisting lock nut 32 in a direction to remove cams 31 from slots 38 and place them in slots 37, this permitting the front end 27 of the support collar to return to its normal configuration thus returning slots 29 their normal width to permit the locking ears 23 to be withdrawn therefrom and the utensil separated from the handle.

Referring now to the shield 12 and the detail of the swivel and locking mechanism as disclosed in FIGS. 3 and 4 of the drawings, it is seen that the shield 12 is comprised of an outer rim 40 which, while generally shown in a circular configuration may be of any configuration desired by the user, such as square, oblong, elliptical or the like, with the rim provided with a fine mesh screen 41 extending therebetween with the edges of the screen being crimped or spot welded to the outer rim and with there being disposed approximately centrally of the screen an opening into which the locking and swivel mechanism 42 is secured.

The lock and swivel mechanism 42 is comprised of a pair of substantially flat circular ring shaped plate members 43 which are identical in configuration and with each provided with semi-cylindrical recess 44 in their interior surfaces 45 and with each having a circular opening 46 defined centrally thereof, the plates adapted to be disposed on each side of the screen 41 at the central opening thereof with the interior surfaces 45 disposed in juxtaposition and the semi-circular recesses 44 disposed in confronting aligned relationship to define cylindrical recesses therebetween, the plates being secured together by a plurality of rivets 47 passing through aligned apertures 48 in the plate members to secure the plates together. Disposed centrally of the openings 46 is a collar member 50 having a bore 51 axially extending therethrough and provided with a pair of aligned pivot arms 52 which project from diametrically opposed portions of the side walls of the collar and which are of a diameter to be rotatably received in aligned recesses 44 of rings 43 to provide for pivotal movement of the collar about the axis of the rods relative to the plane of the plate members. Disposed inwardly of bore 51 is an annular recess (not shown) which receives therein a resilient spring 53 which is of an elongated cylindrical configuration having a slot 54 extending through one side thereof such that the spring has a general C-shaped cross-section with the normal interior diameter 55 of the spring being slightly less than the diameter of utensil shaft 11 so as to frictionally engage the same in a sliding manner as the shaft is passed therethrough during the positioning of the shield 12 on the shaft, the friction between the spring 53 and the shaft serving to retain the shield at any selected position thereon, and with the friction between recesses 45 and rods 52 being sufficient to retain the shield at any selected angular position pivoted about the axis of the rods 52 at any selected angle to the axis of the utensil shaft.

In operation it is only required that the end of the shaft 11 be axially aligned with bore 51 and then passed axially therethrough to engage the shaft frictionally in the spring 55 with the shaft being slidable therethrough until the desired position thereon is reached for the shield 12, this position being frictionally retained by action of the spring on the shaft.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A universal culinary tool including a protective screen type shield and which is adapted for use with a plurality of interchangeable kitchen utensils, the combination comprising:

a kitchen utensil having an elongated cylindrical shaft, the shaft terminating at one end in a terminal end portion having a reduced diameter relative to the diameter of the main shaft, the reduced diameter portion defining with the main shaft portion an annular shoulder therebetween, and a pair of diametrically opposed axially extending locking ear members each projecting outwardly of the reduced shaft end portion;

an elongated handle member having a closed back end and a front end provided with an axially extending recess opening out of said front end;

attachment means mounted on said front end of said handle and adapted to receive said terminal end portion of said utensil shaft therein for removably securing said shaft to said handle;

a protective screen shield comprised of an endless rim member of a size and configuration substantially greater than the utensil shaft, a fine mesh screen affixed to said rim and projecting therebetween in the plane of said rim, an opening extending transversely through said screen approximately centrally thereof; and a lock and swivel mechanism affixed to said screen in said opening and adapted to slidingly receive said utensil shaft therethrough for positioning said screen shield at any selected position along said shaft with said shield being swivelly supported for swinging movement to occupy selected positions relative to the axis of the utensil shaft.

2. The combination as set forth in claim 1 wherein said locking mechanism for removably securing said utensil shaft to said handle is comprised of an elongated hollow cylindrically shaped open ended support collar member having a back end, a front end, and cylindrical side wall surfaces interconnecting the back and front ends, the back end portion of the support collar adapted to be axially inserted into said handle recess and permanently affixed therein, a pair of diametrically spaced apart axially extending slots defined in said cylindrical side walls and opening out of said collar front end, the slots being of a size and configuration adapted to slidingly receive said utensil shaft locking ears therein, and a pair of diametrically opposed axially extending cam members each mounted on the exterior surface of said side walls contiguous with the support collar front end and with each cam having an arcuate cross-section, and said slots dividing said support collar front end portion into a pair of diametrically opposed resilient members adapted to be flexed in a direction inwardly of each other in a manner to decrease the width of said slots; a twist lock nut of an elongated generally cylindrical hollow configuration having a bore extending therethrough and provided with a back edge, a front surface, and cylindrical side walls, the bore opening out of the front surface and back edge and being of a diameter substantially equal to the exterior diameter of said support collar member, a first pair of diametrically opposed axially extending slots disposed in said bore and opening out of said front surface with each slot having an arcuate cross-section of a size and configuration greater than the size and configuration of the cams on the support collar, a second pair of diametrically opposed axially extending slots spaced circumferally a short distance from said first pair of slots with each of said second pair of slots having an arcuate cross-section of a size and configuration smaller than the size and configuration of said support collar cams, said twist locking nut adapted to be disposed concentrically about the support collar member and rotatable relative thereto between a first position engaging said cams in said first pair of slots and to a second position engaging said cams in said second pair of slots which, due to being of a smaller size and configuration than said cams, effects the inward flexing movement of the front end portions of said support collar member in a manner to reduce the width of said slots and thus removably retain said shaft locking ears in said slots.

3. The combination as set forth in claim 1 wherein said lock and swivel mechanism is comprised of a pair of substantially identical flat circular ring members each provided with diametrically opposed radially extending semi-cylindrical recesses formed in confronting interior surfaces thereof, the ring members adapted to be disposed on each side surface of the screen about the central opening therein and then affixed together in juxtaposition by a plurality of fastening means passing through said ring members, a hollow open ended elongated cylindrical collar member disposed centrally in the openings of said ring members and rotatably affixed relative thereto by a pair of axially aligned rod members projecting outwardly from the collar member side walls at diametric opposed positions thereon with said rods extending a sufficient length and being of a diameter to be rotatably received in said confronting semi-cylindrical recesses of said ring members for pivotal support of said collar member relative thereto, said collar member having a bore axially extending therethrough, an annular recess disposed inwardly of said bore intermediate opposed ends of said collar member, and an elongated spring having a general C-shaped configuration received in said annular recess and having an interior diameter slightly less than the diameter of said utensil shaft for frictional sliding engagement of said utensil shaft therethrough.

* * * * *